2,772,237

PROCESS FOR REMOVING ACIDS FROM AQUEOUS SOLUTIONS OF ORGANIC SOLUTES WITH ION EXCHANGE RESINS

William C. Bauman and Donald F. Harrington, Midland, Mich., assignors to The Dow Chemical Company, Midland, Mich., a corporation of Delaware No Drawing. Application May 12, 1953,
Serial No. 354,632

6 Claims. (Cl. 210—24)

This invention concerns a method for removing strong acids from aqueous solutions of organic solutes by use of ion exchange resins. It relates especially to a method for removing strong acids from an aqueous solution of a lowly ionized organic solute with an anion exchange resin in the sulfate form and, more particularly, to a procedure for regenerating the anion exchange resin.

The removal of strong acids such as sulfuric acid or hydrochloric acid, or salts thereof, from aqueous solutions by use of ion exchange resins is well known. The most common procedure is to contact an aqueous acidic solution with a bed of an anion exchange resin in its basic or hydroxide form, whereby the acid is absorbed on the resin and is removed from the solution. In the case of a dissolved salt of a strong acid, the aqueous salt solution is first contacted with a bed of a cation exchange resin in its hydrogen form, then contacted with a bed of an anion exchange resin in its basic form. After absorption of the acid the anion exchange resin is regenerated to the basic form by treating the same with an aqueous solution of an alkali, e. g. an aqueous 4 percent by weight solution of sodium hydroxide. The cation exchange resin is regenerated to the hydrogen form by washing the same with a dilute aqueous solution of an acid such as sulfuric or hydrochloric acid.

It has now been found that an acid having an ionization constant of at least $1.4 \times 10^{-3}$ can readily be removed from an aqueous solution containing a non-ionized, or lowly ionized organic solute by contacting the aqueous slution with an anion exchange resin in the sulfate form. The highly ionized acid is sorbed on the sulfate form of the anion exchange resin with conversion of the latter in part to the bisulfate form and is removed from the solution. The aqueous solution of the organic solute is drained or washed from the resin with water, after which the anion exchange resin is regenerated to the sulfate form by washing with water.

The invention is based on a discovery that when an aqueous solution of a non-ionized, or lowly ionized, organic solute containing a strong acid such as sulfuric acid, hydrochloric acid, chloroacetic acid, or ethylene disulfonic acid, is passed through a bed of an anion exchange resin in the sulfate form, the insoluble resin sorbs the highly ionized acid and removes it from the solution, with conversion of at least a portion of the anion exchange resin to the bisulfate form. The insoluble anion exchange resin, after sorbing the highly ionized acid is readily reconverted to the sulfate form by merely washing with water.

Any anion exchange resin containing primary-, secondary-, or tertiary amino groups, or quaternary ammonium groups, may be employed in the process. Examples of suitable anion exchange resins are the resinous condensation products of phenol, formaldehyde and alkylene polyamines which are described in U. S. Patent No. 2,341,907; the nitrogen-containing resinous compositions which are disclosed in U. S. Patent No. 2,591,574; and the strongly basic quaternary ammonium anion exchange resins which are disclosed in U. S. Patents Nos. 2,591,573 and 2,614,099. The resins are preferably strongly basic quaternary ammonium anion exchange resins such as are obtained by the reaction of a tertiary amine and a halomethylated cross-linked insoluble polymer of a vinyl aromatic compound. The anion exchange resin is employed in the sulfate form.

The sulfate form of such anion exchange resins may be employed to sorb any strong organic, or inorganic, acid having an ionization constant of at least $1.4 \times 10^{-3}$, or greater, at 25° C. from an aqueous solution of a non-ionized or lowly ionized organic compound, i. e. an organic compound having an ionization constant of $1.75 \times 10^{-5}$, or lower, at 25° C. by contacting the aqueous solution with the anion exchange resin, e. g. by passing the solution through a bed of the anion exchange resin in a column or other suitable vessel.

Examples of non-ionized, or lowly ionized, water-soluble organic compounds which may be separated from strong acids in an aqueous solution as herein described are, the water soluble lower aliphatic alcohols, such as methyl alcohol, ethyl alcohol, and isopropyl alcohol; polyhydric alcohols, e. g. glycerine, sucrose, pentaerythritol; glycols including ethylene glycol, propylene glycol, butylene glycol and polyethylene glycols; or monoethers of ethylene glycol or a polyethylene glycol; and lowly ionized organic acids such as acetic acid, propionic acid, butyric acid; or ketones such as acetone, or methyl ethyl ketone, or amides such as acetamide, or acrylamide.

Examples of strong acids which are sorbed from an aqueous solution containing the same and one or more of the aforementioned non-ionized, or lowly ionized, organic compounds as solute, by the sulfate form of an insoluble anion exchange resin are, sulfuric acid, hydrochloric acid, hydrobromic acid, nitric acid, phosphoric acid, pyrophosphoric acid, ethylene disulfonic acid, benzene sulfonic acid, toluene sulfonic acid, naphthalene sulfonic acid, chloroacetic acid, dichloroacetic acid, and trichloroacetic acid.

The process is usually carried out at room temperature or thereabout, and at atmospheric or substantially atmospheric pressure, although the process may be carried out at temperatures up to about 90° F. The method should not be carried out at temperatures which are injurious to the resin. In practice, an aqueous solution of a non-ionized, or lowly, ionized organic solute, containing a strong acid having an ionization constant of at least $1.4 \times 10^{-3}$ at 25° C., is fed into contact with a bed of an anion exchange resin in the sulfate form at a rate such that the strong acid is sorbed by the anion exchange resin, e. g. at a rate corresponding to one gallon of the solution per minute per square foot of cross-section of the resin bed, or less. The treated solution is drained or eluted from the bed of the resin and is collected as one or more successive fractions, after which the resin is regenerated to the sulfate form by washing with water.

It may be mentioned that when the strong acid sorbed by the anion exchange resin is sulfuric acid, regeneration of the anion exchange resin to the sulfate form may be carried out by washing the bed of the resin with water employing con-current, or counter-current, flow of the water to the direction of flow of the aqueous acidic solution of the organic solute through the bed of the resin. However, when the strong acid sorbed by the anion exchange resin is an acid other than sulfuric acid, it is important that the bed of the anion exchange resin be washed with water counter-currently to the direction of flow of the aqueous acidic solution of the organic solute through the bed of the resin in order to obtain satisfactory regeneration of the anion exchange resin to the sulfate form.

The water to be employed as a regenerant should be reasonably pure, i. e. it should be free or substantially free from dissolved ionizable solute. Distilled water, or deionized water, i. e. water that has been demineralized by usual ion exchange methods, is satisfactory.

The method herein described may be employed to remove salts of strong acids from aqueous solutions of non-ionized or lowly ionized organic solutes by first passing the solution through a bed of a cation exchange resin in hydrogen form to convert the salt to the corresponding strong acid, then passing the acidic solution into contact with a bed of an ion exchange resin in the sulfate form and draining or washing the treated solution from the resin.

More specifically, a lower portion of an elongated vessel or column may be filled with a bed of a granular anion exchange resin. The bed is covered with a porous medium such as glass wool, or a porous ceramic plate. The column is filled with an upper bed of a suitable cation exchange resin in granular form. During flow of a liquid through the two beds, effluent liquor from the bed of the cation exchange resin is immediately contacted with the bed of the anion exchange resin, or vice versa, depending upon the direction of flow of fluid. Any cation exchange resin containing sulfonic acid radicals may be used. Examples of suitable cation exchange resins are the insoluble sulfonated phenol-formaldehyde resins and the insoluble sulfonated vinyl aromatic resins such as Amberlite IR-120, Amberlite IR-112, or Dowex-50. The beds of the resins are washed with a dilute, e. g. a one percent by weight, aqueous solution of sulfuric acid to convert he cation exchange resin to the hydrogen form and the anion exchange resin to the sulfate form, after which the beds are rinsed with water. Thereafter, an aqueous solution of a non-ionized, or lowly ionized, organic solute containing a salt of a strong acid, i. e. a salt of an acid having an ionization constant of at least $1.4 \times 10^{-3}$ at 25° C. such as an aqueous solution of sucrose and sodium chloride, is passed down-flow through the beds of the ion exchange resins, the treated solution is displaced or eluted from the beds of the resins with water and the effluent liquor is collected as successive fractions. Water is then passed upflow first hrough the bed of the anion exchange resin, whereby said resin is regenerated to the sulfate form with displacement of the sorbed acid from the anion exchange resin into the water. The acidic water is passed into contact with the cation exchange resin and displaces the sorbed metal ions from the cation exchange resin and introduces the same into the water, whereby the cation exchange resin is regenerated, or is substantially regenerated, to the hydrogen form. In most instances, regeneration of the cation exchange resin to the hydrogen form corresponds to approximately 85 percent of the metallic ions absorbed, because of the low concentration of acid in the effluent water from the bed of the anion exchange resin. However, the process may be carried out for a plurality of cycles, e. g. at least four or more cycles, after which the beds of the ion exchange resins may be treated with a dilute aqueous solution of sulfuric acid, rinsed with water, and the process continued. Such procedure permits the separation of a salt of a strong acid from an aqueous solution of a non-ionized or lowly ionized organic solute in a satisfactory manner, without regeneration of the resins with an aqueous solution of an acid, or an alkali, respectively, during each cycle of operations.

If desired, the above-stated relative positions of the beds of ion exchange materials may be reversed, the cation exchange resin being below the anion exchange resin, in which case the directions of liquid flow are also opposite to those given above.

The following examples illustrate ways in which the principle of the invention has been applied, but are not to be construed as limiting its scope.

*Example 1*

A charge of 100 cc. of a batch of a granular strongly basic quaternary ammonium anion exchange resin was placed in a 100 ml. glass burette to form a bed of the resin approximately 56 centimeters deep. The anion exchange resin was in the form of rounded granules of sizes such as to pass through a 50 mesh per inch standard U. S. screen and be retained on a 100 mesh per inch screen. It was swollen with water and contained approximately 50 percent by weight of water in the resin granules. The anion exchange resin was composed of the reaction product of trimethylamine and a chloromethylated copolymer of approximately 87 percent by weight styrene, 5 percent ethylvinylbenzene and 8 percent divinylbenzene. The resin was converted to its sulfate form by passing a dilute aqueous solution of sulfuric acid through the bed of the resin after which the resin was washed with water until the effluent liquor was neutral to litmus paper. The resin had an anion exchange capacity corresponding to 1.4 milliequivalents per cubic centimeter of a bed of the wet resin. The burette was filled to the top level of the resin bed with 30 cc. of water. Thereafter, 5 cc. of an aqueous solution having a density of 1.03 at 25° C. and containing 10 percent by weight of ethylene glycol and 10 percent of hydrochloric acid was fed to the column with resultant displacement from the bed of the resin of an equal volume of water. After feeding the 5 cc. of the aqueous glycol and HCl solution to the column, water was slowly introduced at a rate of one milliliter per minute and passed downflow through the bed of the resin. The effluent liquor was collected as successive fractions and each fraction was tested to determine its index of refraction and its acidity. The index of refraction constitutes an indirect, but easily determined measure of the concentration of solute in the effluent liquor. Table I identifies the fractions as being stated portions of the effluent liquor and gives the index of refraction of each at 35° C.

TABLE I

*Effluent liquor*

| Fraction No. | Volume, cc. | $n_D^{35°}$ C. |
|---|---|---|
| 1 | 0–50 | 1.3312 |
| 2 | 50–52 | 1.3315 |
| 3 | 52–54 | 1.3320 |
| 4 | 54–56 | 1.3333 |
| 5 | 56–58 | 1.3349 |
| 6 | 58–60 | 1.3355 |
| 7 | 60–62 | 1.3355 |
| 8 | 62–64 | 1.3349 |
| 9 | 64–66 | 1.3333 |
| 10 | 66–68 | 1.3321 |
| 11 | 68–70 | 1.3317 |
| 12 | 70–72 | 1.3314 |
| 13 | 72–80 | 1.3312 |

The first of the above fractions was water. Fractions 2–12 were water containing the ethylene glycol in greater dilution than in the feed solution. These fractions contained 97.2 percent by weight of the ethylene glycol and were neutral to litmus paper. Fraction 13 was water containing no acid.

After collecting the above 80 cc. of effluent liquor, deionized water, i. e. water purified by ion exchange methods, was fed to a lower portion of the column at a rate of one milliliter per minute and passed upflow through the bed of the resin. The effluent liquor was collected as successive fractions and each fraction was analyzed for hydrochloric acid. After feeding 750 cc. of water to the column the effluent liquor was found to contain 0.51 grams of hydrochloric acid. The bed of the anion exchange resin was 99 per cent regenerated to its sulfate form.

*Example 2*

The column containing the bed of the anion exchange resin described in Example 1, in its sulfate form was filled with water to the top level of the resin bed. Thereafter, 5 cc. of an aqueous solution having a density of 1.203 at 25° C. and containing 19.25 percent by weight of acrylamide, and 26.62 percent of sulfuric acid, was fed to the column with resultant displacement from the bed of an equal volume of water. After feed of the 5 cc. of the solution to the bed, deionized water was introduced at a rate of 1 cc. per minute and passed down flow through the bed of the resin. The effluent liquor was collected as successive fractions and the index of refraction and acidity determined for each. Table II identifies the fractions as being stated portions of the effluent liquor and gives the index of refraction at 35° C.

TABLE II

*Effluent liquor*

| Fraction No. | Volume, cc. | $n_D^{35°}$ C. |
|---|---|---|
| 1 | 0–40 | 1.3312 |
| 2 | 40–48 | 1.3313 |
| 3 | 48–60 | 1.3314 |
| 4 | 60–64 | 1.3315 |
| 5 | 64–66 | 1.3319 |
| 6 | 66–68 | 1.3325 |
| 7 | 68–70 | 1.3339 |
| 8 | 70–72 | 1.3355 |
| 9 | 72–74 | 1.3363 |
| 10 | 74–76 | 1.3370 |
| 11 | 76–80 | 1.3376 |
| 12 | 80–84 | 1.3375 |
| 13 | 84–86 | 1.3372 |
| 14 | 86–88 | 1.3368 |
| 15 | 88–90 | 1.3361 |
| 16 | 90–92 | 1.3355 |
| 17 | 92–94 | 1.3349 |
| 18 | 94–96 | 1.3344 |
| 19 | 96–98 | 1.3341 |
| 20 | 98–100 | 1.3337 |
| 21 | 100–102 | 1.3331 |
| 22 | 102–104 | 1.3330 |
| 23 | 104–106 | 1.3327 |
| 24 | 106–108 | 1.3322 |
| 25 | 108–110 | 1.3320 |
| 26 | 110–124 | 1.3319 |
| 27 | 124–126 | 1.3318 |
| 28 | 126–128 | 1.3317 |
| 29 | 128–130 | 1.3314 |
| 30 | 130–134 | 1.3313 |
| 31 | 134–192 | 1.3312 |
| 32 | 192–292 | |
| 33 | 292–1300 | |

The first of the above fractions was water. Fractions 2–30 were water containing the acrylamide in greater dilution than in the feed solution. The fractions were neutral to litmus paper, and contained 98.2 percent of the acrylamide. Fraction 32 was water containing no acid. Fraction 33 was water containing 1.6 grams of sulfuric acid. The bed of the anion exchange resin was reconverted to the sulfate form.

Example 3

A charge of 100 cc. of a granular weakly basic anion exchange resin composed of the reaction product of diethylenetriamine and a chloromethylated copolymer of approximately 87 percent by weight of styrene, 5 percent of ar-ethylvinylbenzene and 8 percent divinylbenzene, was placed in a 100 ml. burette to form a bed of the resin approximately 56 centimeters deep. The resin was swollen with water and was in the form of rounded granules of from 50 to 100 mesh per inch sizes as determined by standard U. S. screens. The resin was converted to its sulfate form by treating the same with a dilute aqueous solution of sulfuric acid and was washed with water. The resin had an anion exchange capacity corresponding to 3 milliequivalents per cubic centimeter of a bed of the resin. The column was filled to the top level of the resin bed with 30 cc. of water. Thereafter, 20 cc. of an aqueous solution containing 10 per cent by weight of ethylene glycol and 10 per cent of hydrochloric acid, which solution had a density of 1.03 at 25° C., was fed to the column with resultant displacement from the bed of an equal volume of water. After feed of the 20 cc. of the aqueous solution to the column, water was introduced at a rate of 1 cc. per minute and passed downflow through the bed of the resin. The effluent liquor was collected as successive fractions and the index of refraction determined for each. Table III identifies the fractions as being stated portions of the effluent liquor and gives the index of refraction at 35° C.

TABLE III

*Effluent liquor*

| Fraction No. | Volume, cc. | $n_D^{35°}$ C. |
|---|---|---|
| 1 | 0–46 | 1.3311 |
| 2 | 46–48 | 1.3313 |
| 3 | 48–50 | 1.3317 |
| 4 | 50–52 | 1.3321 |
| 5 | 52–54 | 1.3328 |
| 6 | 54–58 | 1.3336 |
| 7 | 58–60 | 1.3354 |
| 8 | 60–62 | 1.3362 |
| 9 | 62–64 | 1.3370 |
| 10 | 64–66 | 1.3377 |
| 11 | 66–68 | 1.3380 |
| 12 | 68–70 | 1.3381 |
| 13 | 70–72 | 1.3380 |
| 14 | 72–74 | 1.3377 |
| 15 | 74–76 | 1.3371 |
| 16 | 76–78 | 1.3365 |
| 17 | 78–80 | 1.3358 |
| 18 | 80–82 | 1.3351 |
| 19 | 82–84 | 1.3344 |
| 20 | 84–86 | 1.3338 |
| 21 | 86–88 | 1.3333 |
| 22 | 88–90 | 1.3328 |
| 23 | 90–92 | 1.3324 |
| 24 | 92–94 | 1.3321 |
| 25 | 94–96 | 1.3319 |
| 26 | 96–98 | 1.3317 |
| 27 | 98–100 | 1.3315 |
| 28 | 100–102 | 1.3313 |
| 29 | 102–104 | 1.3312 |
| 30 | 104–106 | 1.3311 |

The first of the above fractions was water. Fractions 2–29 were water containing 97.2 percent of the ethylene glycol starting material. The fractions were neutral to litmus paper. Fraction 30 was water containing a trace of acid.

After collecting the above 106 cc. of effluent liquor, the anion exchange resin was regenerated to its sulfate form by introducing water into a lower portion of the column at a rate of 1 cc. per minute and passing the water upflow through the bed of the resin. The effluent liquor was collected as successive fractions and was analyzed for hydrochloric acid. After washing the bed with 4750 cc. of water the resin was 93 percent regenerated to its sulfate form, i.e. the effluent liquor contained 1.92 grams of hydrochloric acid.

Example 4

The bed of the strongly basic quaternary ammonium anion exchange resin described in Example 1, was converted to its sulfate form and the column filled to the top level of the bed with 30 cc. of deionized water. Thereafter, 100 cc. of an equeous solution having a density of 1.043 at 25° C. and containing 15 percent by weight of glycerine and 2 percent of sulfuric acid, together with a trace of organic acids, was introduced into the top of the column at a rate of 1 cc. of the solution per minute and passed downflow through the bed of the resin. After feed of the 100 cc. of the glycerine solution to the column, water was introduced at the same rate to elute the glycerine from the bed and regenerate the resin to its sulfate form. The effluent liquor was collected as successive fractions and the index of refraction determined for each fraction. The acidy of the effluent liquor was determined by analysis. Table IV identifies the fractions as being stated portions of the effluent liquor and gives the index of refraction at 35° C. of each fraction.

TABLE IV

*Effluent liquor*

| Fraction No. | Volume, cc. | $n_D^{35°}$ C. |
|---|---|---|
| 1 | 0-36 | 1.3313 |
| 2 | 36-41 | 1.3314 |
| 3 | 41-46 | 1.3318 |
| 4 | 46-51 | 1.3321 |
| 5 | 51-56 | 1.3330 |
| 6 | 56-61 | 1.3358 |
| 7 | 61-66 | 1.3400 |
| 8 | 66-71 | 1.3430 |
| 9 | 71-75 | 1.3440 |
| 10 | 75-80 | 1.3444 |
| 11 | 80-137 | 1.3447 |
| 12 | 137-142 | 1.3446 |
| 13 | 142-147 | 1.3445 |
| 14 | 147-152 | 1.3438 |
| 15 | 152-157 | 1.3419 |
| 16 | 157-162 | 1.3382 |
| 17 | 162-167 | 1.3343 |
| 18 | 167-171 | 1.3320 |
| 19 | 171-176 | 1.3317 |
| 20 | 176-206 | 1.3315 |
| 21 | 206-246 | 1.3314 |
| 22 | 246-271 | 1.3315 |
| 23 | 271-302 | 1.3314 |
| 24 | 302-351 | 1.3313 |
| 25 | 351-1470 | |

The first of the above fractions was water. Fractions 2–19 were water containing 98 percent of the glycerine starting material. These fractions were neutral to litmus paper. Fractions 20–24 were water containing the trace amounts of organic acids in the starting solution. Fraction 25 was water containing sulfuric acid. This fraction contained 93.2 percent of the acidic starting materials.

*Example 5*

A charge of 460 cc. of "Amberlite IR-4B" (a weakly basic phenol-formaldehyde anion exchange resin containing active nitrogen groups) in granular form of sizes of from 20 to 50 mesh per inch as determined by standard U. S. screens, was placed in a one inch internal diameter tube to form a bed of the resin approximately 35 inches deep. The resin was in its sulfate form and had an anion exchange capacity corresponding to 2.63 milliequivalents per cubic centimeter of a bed of the resin. The column was filled with water to the top level of the resin bed. Thereafter, 320 cc. of an aqueous solution containing 5 percent by weight of ethylene glycol and 4.3 percent of sulfuric acid was fed to the column at a rate corresponding to one gallon of the aqueous solution per square foot of cross-sectional area of the resin bed per minute (approximately 20 cc. of the solution per minute) and passed downflow through the bed of the resin. After feed of the 320 cc. of the aqueous solution to the column, 410 cc. of water was introduced at a rate of approximately 20 cc. per minute to flush the glycol solution from the resin. The effluent liquor was collected as successive fractions. Table V identifies the fractions as being stated portions of the effluent liquor and gives the index of refraction at 35° C.

TABLE V

*Effluent liquor*

| Fraction No. | Volume, cc. | $n_D^{35°}$ C. |
|---|---|---|
| 1 | 0-260 | 1.3312 |
| 2 | 260-730 | 1.3344 |
| 3 | 730-731 | |

The first of the above fractions was water. Fraction No. 2 was water containing 94 percent of the ethylene glycol and was neutral to litmus paper. Fraction No. 3 was water containing a trace of acid. After collecting the above 731 cc. of effluent liquor, water was fed to the column at a rate corresponding to two gallons per square foot of cross-sectional area per minute (about 40 cc. per minute) and passed downflow through the bed of the resin. The effluent liquor was collected as successive fractions and each fraction analyzed for sulfuric acid. Table VI identifies the fractions as being stated portions of the effluent liquor and gives the amount of sulfuric acid, expressed as cubic centimeters of a 1-normal aqueous sulfuric solution, in each.

TABLE VI

*Effluent liquor*

| Fraction No. | Volume, Liters | $H_2SO_4$ cc. $\frac{N}{1}$ Sol'n |
|---|---|---|
| 1 | 0-2 | 206.2 |
| 2 | 2-4 | 32.2 |
| 3 | 4-5.3 | 16.9 |
| 4 | 5.3-7.6 | 9.8 |
| 5 | 7.6-9.8 | 6.1 |
| 6 | 9.8-11.8 | 4.0 |
| 7 | 11.8-13.8 | 2.4 |
| 8 | 13.8-15.9 | 1.9 |
| 9 | 15.9-17.9 | 1.2 |
| 10 | 17.9-19.9 | 0.4 |
| 11 | 19.9-21.9 | 0 |

After collecting the above 21.9 liters of effluent liquor, the bed of the anion exchange resin was 99.7 percent regenerated to the sulfate form.

*Example 6*

A one inch internal diameter glass tube was filled with a granular strongly basic quaternary ammonium anion exchange resin similar to that described in Example 1, to form a bed of the resin 36 inches deep. The anion exchange resin was washed with an aqueous one percent solution of sulfuric acid to convert the resin to its sulfate form, after which the resin was rinsed with water until the effluent liquor was neutral to litmus paper. Thereafter, 500 cc. of an aqueous solution containing 5 percent by weight of ethylene glycol and 5 percent of ethylene disulfonic acid was fed to the column at a rate corresponding to one gallon of the solution per square foot of cross-sectional area of the bed per minute and passed downflow through the bed of the resin. After feed of the 500 cc. of the acidic glycol solution to the column, water was introduced at a rate corresponding to one gallon per square foot of cross-sectional area of the resin bed per minute and passed downflow through the bed to displace the glycol solution. The effluent liquor was collected as successive fractions and the index of refraction determined for each. Table VII identifies the fractions as being stated portions of the effluent liquor and gives the index of refraction at 35° C. The table also gives the amount of glycol in each fraction of the effluent liquor.

TABLE VII

*Effluent liquor*

| Fraction No. | Volume, cc. | $n_D^{35°}$ C. | Ethylene Glycol, gms. |
|---|---|---|---|
| 1 | 0-235 | 1.3313 | 0 |
| 2 | 235-360 | 1.3344 | 4.1 |
| 3 | 360-570 | 1.3361 | 10.7 |
| 4 | 570-790 | 1.3359 | 10.7 |
| 5 | 790-840 | 1.3313 | 0 |

The first of the above fractions was water. Fractions 2–4 were water containing all of the ethylene glycol and were neutral to litmus paper. Fraction 5 was water.

After collecting the above 840 cc. of effluent liquor, the column was inverted. Water was fed to the column at a rate corresponding to one gallon of the water per square foot of cross-sectional area of the resin bed per minute and passed downflow through the bed of the resin. The effluent liquor was collected as successive fractions and each fraction analyzed for acid. Table VIII identifies each fraction as being stated portions of the effluent liquor and gives the amount of ethylene disulfonic acid, expressed as cubic centimeters of a 1-normal aqueous solution of said acid, in each.

TABLE VIII

Effluent liquor

| Fraction No. | Volume, cc. | Ethylene Disulfonic Acid, cc. $\frac{N}{1}$ Sol'n |
|---|---|---|
| 1 | 0–230 | 0 |
| 2 | 230–2,230 | 172.8 |
| 3 | 2,230–4,230 | 63.8 |
| 4 | 4,230–6,130 | 19.9 |

The first of the above fractions was water. Fractions Nos. 2–4 were water containing the ethylene disulfonic acid. The bed of the anion exchange resin was 99.8 percent regenerated to the sulfate form.

*Example 7*

A 100 ml. glass burette was filled with a granular strongly basic quaternary ammonium anion exchange resin to form a bed of the resin 31 centimeters deep. The anion exchange resin was composed of the reaction product of trimethylamine and a chloromethylated copolymer of approximately 87 percent styrene, 5 percent ar-ethylvinylbenzene and 8 percent divinylbenzene. The resin was in the form of rounded granules of a size such as to pass through a 50 mesh per inch standard U. S. screen and be retained on a 100 mesh per inch screen. The resin contained approximately 50 percent by weight of water and had an anion exchange capacity of 1.4 milliequivalents per cubic centimeter of a bed of the wet resin. A layer of glass wool was placed on top of the bed of the anion exchange resin. A granular cation exchange resin was placed in the burette to form a bed of said resin 25.4 centimeters deep, above the bed of the anion exchange resin. The cation exchange resin was composed of a sulfonated copolymer of approximately 87 percent styrene, 5 percent ar-ethylvinylbenzene and 8 percent divinylbenzene. The resin was in the form of rounded beads of sizes from 50 to 80 mesh per inch as determined by U. S. screens. The cation exchange resin had an ion exchange capacity of 2 milliequivalents per cubic centimeter of a bed of the wet resin. The beds of the ion exchange resins were washed with an aqueous one percent solution of sulfuric acid and rinsed with water until the effluent liquor was neutral to litmus paper. The cation exchange resin was in the hydrogen form. The anion exchange resin was in the sulfate form. The column was filled with water to the top level of the uppermost bed. Thereafter, 10 cc. of an aqueous solution containing 10 percent by weight of sucrose and 10 percent of sodium chloride was fed to the column at a rate of 1 cc. of the solution per minute with resultant displacement from the column of an equal volume of water. After feed of the 5 cc. of the solution to the column, water was introduced at a rate of 1 cc. per minute to flush the liquor from the beds of the resins. The effluent liquor was collected as successive fractions and the index of refraction determined for each fraction. Table IX identifies the fractions as being stated portions of the effluent liquor and gives the index of refraction of each.

TABLE IX

Effluent liquor

| Fraction No. | Volume, cc. | $n_D^{35°}$ C. |
|---|---|---|
| 1 | 0–32 | 1.3313 |
| 2 | 32–36 | 1.3315 |
| 3 | 36–40 | 1.3320 |
| 4 | 40–44 | 1.3344 |
| 5 | 44–48 | 1.3372 |
| 6 | 48–52 | 1.3390 |
| 7 | 52–54 | 1.3391 |
| 8 | 54–56 | 1.3387 |
| 9 | 56–60 | 1.3358 |
| 10 | 60–64 | 1.3342 |
| 11 | 64–68 | 1.3330 |
| 12 | 68–72 | 1.3323 |
| 13 | 72–76 | 1.3319 |
| 14 | 76–80 | 1.3316 |
| 15 | 80–84 | 1.3314 |
| 16 | 84–88 | 1.3313 |

The first of the above fractions was water. Fractions Nos. 2–15 were water containing 99.6 percent by weight of the sucrose in the feed solution. Fraction No. 16 was water.

After collecting the above 88 cc. of effluent liquor, water was introduced into the bottom of the column at a rate of 1 cc. per minute and passed upflow through the beds of the ion exchange resin. The effluent liquor was collected as successive fractions and each fraction analyzed. The first fraction was water. It had a volume of 38 cc. The second fraction, consisting of 592 cc. of liquid, was water containing sodium chloride and hydrochloric acid. The fraction contained 85 percent by weight of the sodium chloride in the initial feed solution and hydrochloric acid in amount corresponding to 15 percent of the sodium chloride in the feed solution. The third fraction of the effluent liquor was water. The bed of the cation exchange resin was 85 percent regenerated to the hydrogen form.

*Example 8*

A one inch internal diameter glass tube was filled with a granular strongly basic quaternary ammonium anion exchange resin to form a bed of the resin 36 inches deep. The anion exchange resin was composed of the reaction product of trimethylamine and a chloromethylated copolymer of approximately 87.5 percent styrene, 4.5 percent ar-ethylvinylbenzene and 8 percent divinylbenzene. The resin was in the form of rounded granules of sizes from 50 to 100 mesh per inch as determined by standard U. S. screens. The anion exchange resin was converted to its sulfate form by treating the same with an aqueous solution containing one percent by weight of sulfuric acid, after which the resin was washed with water until the effluent liquor was neutral to litmus paper. The resin had an anion exchange capacity of 1.4 milliequivalents per cubic centimeter of a bed of the resin. The column was filled with water to the top level of the resin bed. Thereafter, 300 cc. (303.3 grams) of an aqueous solution containing 10 percent by weight of ethyl alcohol and 4.2 percent by weight of sulfuric acid, was fed to the column at a rate of approximately 10 cc. of the solution per minute and passed downflow through the bed of the anion exchange resin. After feed of the acidic ethyl alcohol solution to the column, water was introduced at a similar rate of feed and passed downflow through the bed of the resin to flush the alcohol from the bed and regenerate the resin to the sulfate form. The effluent liquor was collected as successive fractions. The fractions were tested to determine the index of refraction at 35° C., and the amount of sulfuric acd in each. Table X identifies each fraction as being stated portions of the effluent liquor and gives the index of refraction and the amount of sulfuric acid, expressed as milliequivalents, determined for each fraction.

TABLE X

*Effluent liquor*

| Fraction No. | Volume, cc. | $n_D^{35°}$ C. | $H_2SO_4$ meq. |
|---|---|---|---|
| 1 | 0–260 | 1.3312 | 0 |
| 2 | 260–762 | 1.3348 | 0 |
| 3 | 762–1,262 | 1.3312 | 0 |
| 4 | 1,262–3,272 | | 176 |
| 5 | 3,272–5,298 | | 62.6 |
| 6 | 5,298–7,668 | | 23 |

The first of the above fractions was water. Fraction 2 was water containing all of the ethyl alcohol. The fraction was neutral to litmus paper. Fraction 3 was water. Fractions 4–6 contained sulfuric acid in amount corresponding to the sulfuric acid in the feed solution. The anion exchange resin was regenerated to the sulfate form.

Example 9

A charge of 291.9 grams (280 cc.) of an aqueous solution containing 28.73 grams of acetic acid and 12.88 grams of sulfuric acid, was fed to the water-immersed bed of the strongly basic quaternary ammonium anion exchange resin in the sulfate form described in Example 8, at a rate of approximately 20 cc. of the solution per minute. Thereafter, water was introduced at a similar rate of feed and passed downflow through the bed of the resin. The effluent liquor was collected as successive fractions. The fractions were tested to determine the index of refraction and the amount of sulfuric acid in each. Table XI identifies the fractions as being stated portions of the effluent liquor and gives the index of refraction and the amount of sulfuric acid, expressed as milliequivalents, determined for each fraction.

TABLE XI

*Effluent liquor*

| Fraction No. | Volume, cc. | $n_D^{35°}$ C. | $H_2SO_4$ m. eq. |
|---|---|---|---|
| 1 | 0–450 | 1.3312 | 0 |
| 2 | 450–1,080 | 1.3347 | 0 |
| 3 | 1,080–1,290 | 1.3312 | 0 |
| 4 | 1,290–3,315 | | 166.7 |
| 5 | 3,315–5,515 | | 65.4 |
| 6 | 5,515–8,115 | | 30.2 |

The first of the above fractions was water. Fraction 2 was water containing the acetic acid. It was free from sulfate ions. Fraction 3 was water. Fractions 4–6 were water containing sulfuric acid in amount corresponding to 99.8 percent of the sulfuric acid in the feed solution. The anion exchange resin was regenerated to the sulfate form.

Example 10

A charge of 264.5 grams (260 cc.) of an aqueous solution containing 7.8 grams (131 milliequivalents) of acetic acid and 13.14 grams (139 milliequivalents) of chloroacetic acid, was fed to the water-immersed bed of the strongly basic quaternary ammonium anion exchange resin in the sulfate form, described in Example 8, at a rate of 20 cc. of the solution per minute and was passed downflow through the bed of the resin. After feed of the 260 cc. of solution, water was introduced at the same rate of feed to wash the solution from the bed of the resin. The effluent liquor was collected as successive fractions. The fractions were tested to determine the index of refraction at 35° C. and the amount of acetic acid in each. Table XII identifies the fractions as being stated portions of the effluent liquor and gives the index of refraction and the amount of acetic acid, expressed as milliequivalents, determined for each fraction.

TABLE XII

*Effluent liquor*

| Fraction No. | Volume, cc. | $n_D^{35°}$ C. | Acetic Acid, m. eq. |
|---|---|---|---|
| 1 | 0–500 | 1.3312 | 0 |
| 2 | 500–1,093 | 1.3321 | 130 |
| 3 | 1,093–1,113 | 1.3312 | 0 |

The first of the above fractions was water. Fraction No. 2 was water containing the acetic acid. Fraction No. 3 was water.

After collecting the above 1113 cc. of effluent liquor, the column was inverted. Water was introduced at a rate of 20 cc. per minute and passed downflow through the bed of the resin to displace the sorbed chloroacetic acid from the resin and regenerate the latter to the sulfate form. The effluent liquor was collected as successive fractions. The fractions were tested for index of refraction and the amount of chloroacetic acid in each. Table XIII identifies the fractions as being stated portions of the effluent liquor and gives the index of refraction and the amount of chloroacetic acid, expressed as milliequivalents, determined for each fraction.

TABLE XIII

*Effluent liquor*

| Fraction No. | Volume, cc. | $n_D^{35°}$ C. | Chloroacetic Acid, m. eq. |
|---|---|---|---|
| 1 | 0–365 | 1.3312 | 0 |
| 2 | 365–2505 | | 128 |
| 3 | 2,505–3,885 | | 11 |

The first of the above fractions was water. Fractions Nos. 2 and 3 were water containing the chloroacetic acid. The anion exchange resin was in the sulfate form.

Example 11

A charge of 121.9 grams (118 cc.) of an aqueous solution containing 10 percent by weight of methyl ethyl ketone and 9.5 grams (260 milliequivalents) of orthophosphoric acid, was fed to the bed of the strongly basic quaternary ammonium anion exchange resin in the sulfate form described in Example 8, at a rate of 20 cc. of the solution per minute and was passed downflow through the bed of the resin. After feed of the 118 cc. of solution to the column, water was introduced at the same rate of feed to wash the solution from the bed of the resin. The effluent liquor was collected as successive fractions. The fractions were tested for acid, and the index of refraction determined for each. Table XIV identifies the fractions as being stated portions of the effluent liquor and gives the index of refraction at 35° C.

TABLE XIV

*Effluent liquor*

| Fraction No. | Volume, cc. | $n_D^{35°}$ C. |
|---|---|---|
| 1 | 0–270 | 1.3312 |
| 2 | 270–741 | 1.3330 |
| 3 | 741–751 | 1.3312 |

The first of the above fractions was water. Fraction No. 2 was water containing the methyl ethyl ketone in concentration of 2.67 percent by weight. The fraction weighed 456.8 grams. It was neutral to litmus paper. Fraction No. 3 was water.

After collecting the above 751 cc. of effluent liquor, the column was inverted. Water was fed to the column at a rate of 20 cc. per minute and passed downflow through the bed of the resin. The effluent liquor was collected as successive fractions. The index of refraction and amount of phosphoric acid was determined for each. Table XV identifies the fractions as being stated portions of the effluent liquor and gives the index of refraction and the amount of phosphoric acid, expressed as milli-equivalents, determined for each fraction.

TABLE XV

*Effluent liquor*

| Fraction No. | Volume, cc. | $n_D^{35°}$ C. | $H_3PO_4$, meq. |
|---|---|---|---|
| 1 | 0–250 | 1.3312 | 0 |
| 2 | 250–2,170 | | 238 |
| 3 | 2,170–4,170 | | 20 |

The first of the above fractions was water. Fractions Nos. 2 and 3 were water containing the phosphoric acid. The anion exchange resin was 99.2 percent regenerated to the sulfate form.

We claim:

1. A process for removing a strong acid from an aqueous solution of an organic solute, which process comprises passing an aqueous solution containing a strong acid having an ionization constant of at least $1.4 \times 10^{-3}$ at 25° C., and an organic compound having an acidity corresponding to an ionization constant not exceeding $1.75 \times 10^{-5}$ at 25° C., as solute, into contact with a water-immersed bed of an anion exchange resin in the sulfate form and thus displacing from the bed an equal volume of water, whereby the strong acid solute is absorbed by the resin and thus converts at least a portion of the anion exchange resin to the bisulfate form, then feeding water to the bed to displace a further amount of liquid from the bed, and collecting successive fractions of the effluent liquid, whereby there is obtained a fraction of the displaced effluent liquid which contains a major portion of the organic compound as solute, and thereafter washing the anion exchange resin with water, whereby the anion exchange resin is regenerated to the sulfate form.

2. A process as claimed in claim 1, wherein the anion exchange resin is a strongly basic quaternary ammonium anion exchange resin.

3. A process as claimed in claim 1, wherein the strong acid is sulfuric acid.

4. A process as claimed in claim 1, wherein the organic compound is a polyhydric alcohol.

5. A process as claimed in claim 1, wherein the cycle of operations is repeated.

6. A process which comprises feeding an aqueous solution of glycerine containing sulfuric acid into contact with a water-immersed bed of a strongly basic quaternary ammonium anion exchange resin in the sulfate form and thus displacing from the bed an equal volume of water, whereby the sulfuric acid is absorbed by the resin and thus converts at least a portion of the anion exchange resin to the bisulfate form, then feeding water to the bed to displace a further amount of liquid from the bed, and collecting successive fractions of the effluent liquid, whereby there is obtained a fraction of the displaced effluent liquid which contains a major portion of the glycerine as solute, and thereafter washing the anion exchange resin with water, whereby the resin is regenerated to the sulfate form.

References Cited in the file of this patent

UNITED STATES PATENTS

| | | |
|---|---|---|
| 2,341,907 | Cheetham et al. | Feb. 15, 1944 |
| 2,487,574 | Meng | Nov. 8, 1949 |
| 2,543,666 | Michael | Feb. 27, 1951 |
| 2,559,529 | Bauman | July 3, 1951 |
| 2,591,573 | McBurney | Apr. 1, 1952 |
| 2,615,924 | Reents | Oct. 28, 1952 |
| 2,632,001 | McMaster et al. | Mar. 17, 1953 |

OTHER REFERENCES

Ind. and Eng. Chem., vol. 33, No. 10, October 1941, pages 1270–1275.